United States Patent
Hu

(10) Patent No.: US 8,325,765 B2
(45) Date of Patent: Dec. 4, 2012

(54) SUPER-FRAME STRUCTURE FOR DYNAMIC SPECTRUM SHARING IN WIRELESS NETWORKS

(75) Inventor: Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 460 days.

(21) Appl. No.: 12/616,027

(22) Filed: Nov. 10, 2009

(65) Prior Publication Data

US 2010/0142559 A1 Jun. 10, 2010

Related U.S. Application Data

(60) Provisional application No. 61/120,256, filed on Dec. 5, 2008.

(51) Int. Cl.
*H04J 3/24* (2006.01)
(52) U.S. Cl. ........ 370/474; 370/480; 370/326; 370/336; 370/347; 370/329; 455/509
(58) Field of Classification Search .............. 370/474
See application file for complete search history.

(56) References Cited

U.S. PATENT DOCUMENTS

| | | | |
|---|---|---|---|
| 2002/0009070 A1* | 1/2002 | Lindsay et al. | 370/347 |
| 2002/0156885 A1* | 10/2002 | Thakkar | 709/224 |
| 2007/0081484 A1* | 4/2007 | Wang | 370/315 |
| 2007/0287465 A1* | 12/2007 | Hyon et al. | 455/450 |
| 2008/0159258 A1* | 7/2008 | Ji et al. | 370/350 |
| 2009/0103501 A1 | 4/2009 | Farrag et al. | |
| 2010/0226342 A1 | 9/2010 | Colling et al. | |

OTHER PUBLICATIONS

Cordeiro et al., "IEEE 802.22: The First Worldwide Wireless Standard based on Cognitive Radios", IEEE, 2005.
Hu et al., "Efficient, Flexible, and Scalable Inter-Network Spectrum Sharing and Communications in Cognitive IEEE 802.22 Networks", IEEE, 2008.

\* cited by examiner

*Primary Examiner* — Jason Mattis
*Assistant Examiner* — Stephen J Clawson
(74) *Attorney, Agent, or Firm* — Hogan Lovells US LLP

(57) ABSTRACT

A coexistence communications method for use between wireless networks includes adopting a super-frame structure for use in a wireless network having a plurality of frames, wherein a first frame includes a super-frame preamble, a super-frame control header, a data portion, and a regular self-coexistence window, an intermediate frame includes an OFDM symbol, a data portion, and a regular self-coexistence window, and a last frame includes an OFDM symbol, a data portion, and a joining self-coexistence window, using the self-coexistence windows to exchange inter-wireless network co-existence messages, and using a last reserved self-coexistence window to announce intra-wireless network negotiation decisions.

18 Claims, 3 Drawing Sheets

SUPER-FRAME STRUCTURE FOR DYNAMIC SPECTRUM SHARING IN WIRELESS NETWORKS

CROSS REFERENCE TO PRIORITY AND RELATED PATENT APPLICATION

This application claims the benefit of U.S. Provisional Patent Application No. 61/120,256, filed on Dec. 5, 2008, which is hereby incorporated by reference for all purposes as if fully set forth herein.

The present invention is also related to the subject matter disclosed in U.S. patent application Ser. No. 12/616,012 filed on Nov. 10, 2009 for: "FRAME-BASED ON-DEMAND SPECTRUM CONTENTION PROTOCOL-MESSAGING METHOD", assigned to the assignee of the present invention, the disclosure of which is herein specifically incorporated by this reference in its entirety.

BACKGROUND OF THE INVENTION

The present invention relates to wireless systems and, more specifically to an super-frame structure that allows efficient spectrum sharing and cross-channel inter-cell communications for IEEE 802.22 systems.

In recent years wireless systems have been proliferating. Wireless networks share a scarce resource, the electromagnetic spectrum, which results in bandwidth contention and RF interference between individual nodes and subnets, and opens the door for novel security threats. Since the wireless spectrum is a limited resource, there is significant economic pressure to use the spectrum efficiently. Spectrum sharing is difficult since wireless systems are typically not isolated by frequency from each other for wireless subnets desiring to share spectrum in the same physical area. Even though spectrum is a shared resource, it is currently not being used efficiently, both for regulatory and technical reasons. It is critical that any proposed solution for spectrum sharing must allow users to negotiate access to spectrum and must be able to switch between frequencies and protocols.

What is desired, therefore, is a solution to allow efficient dynamic spectrum sharing in overlapping wireless systems.

SUMMARY OF THE INVENTION

A super-frame structure for use in a wireless network according to an embodiment of the present invention includes a plurality of frames, wherein a first frame includes a super-frame preamble, a super-frame control header, a data portion, and a regular self-coexistence window. The super-frame preamble comprises a first OFDM symbol and a second OFDM symbol. The super-frame control header is compatible with the IEEE 802.22 standard, includes information common to other wireless networks, and includes a header check sequence. The regular self-coexistence window can be a reserved self-coexistence window for transmitting a coexistence beacon. The coexistence beacon includes a three-symbol protocol data unit. A first symbol includes a coexistence beacon preamble, a second symbol includes a coexistence beaconing protocol header and super-frame control information, and a third symbol includes a coexistence beaconing protocol information element. The super-frame control information includes a system type, a wireless network cell ID, a data frame reservation map, and a self-coexistence window reservation map. An intermediate frame includes an OFDM symbol, a data portion, and a regular self-coexistence window. A last frame includes an OFDM symbol, a data portion, and a joining self-coexistence window. The joining self-coexistence window is accessed by all wireless network cells on a particular RF channel through a contention-based access method.

According to an embodiment of the present invention, a coexistence communications method for use between wireless networks includes adopting a super-frame structure for use in a wireless network comprising a plurality of frames, wherein a first frame includes a super-frame preamble, a super-frame control header, a data portion, and a regular self-coexistence window, an intermediate frame includes an OFDM symbol, a data portion, and a regular self-coexistence window, and a last frame includes an OFDM symbol, a data portion, and a joining self-coexistence window, using the self-coexistence windows to exchange inter-wireless network cell co-existence messages, and using a last reserved self-coexistence window to announce intra-wireless network negotiation decisions.

According to an embodiment of the present invention, a coexistence communications method for use between wireless networks includes adopting a super-frame structure for use in a wireless network comprising a plurality of frames, wherein a first frame includes a super-frame preamble, a super-frame control header, a data portion, and a regular self-coexistence window, an intermediate frame includes an OFDM symbol, a data portion, and a regular self-coexistence window, and a last frame includes an OFDM symbol, a data portion, and a joining self-coexistence window, discovering the self-coexistence reservation pattern on an out-of-band RF channel, identifying the reserved self-coexistence windows of source wireless networks on the out-of band RF channel from the discovered self-coexistence window pattern, and receiving coexistence beaconing protocol packets during the reserved self-coexistence windows of the source wireless networks on the out-of band RF channel.

BRIEF DESCRIPTION OF THE DRAWINGS

The present invention is illustrated by way of example and not by limitation in the accompanying figures in which like reference numerals indicate similar elements and in which.

DETAILED DESCRIPTION

Figure 1:
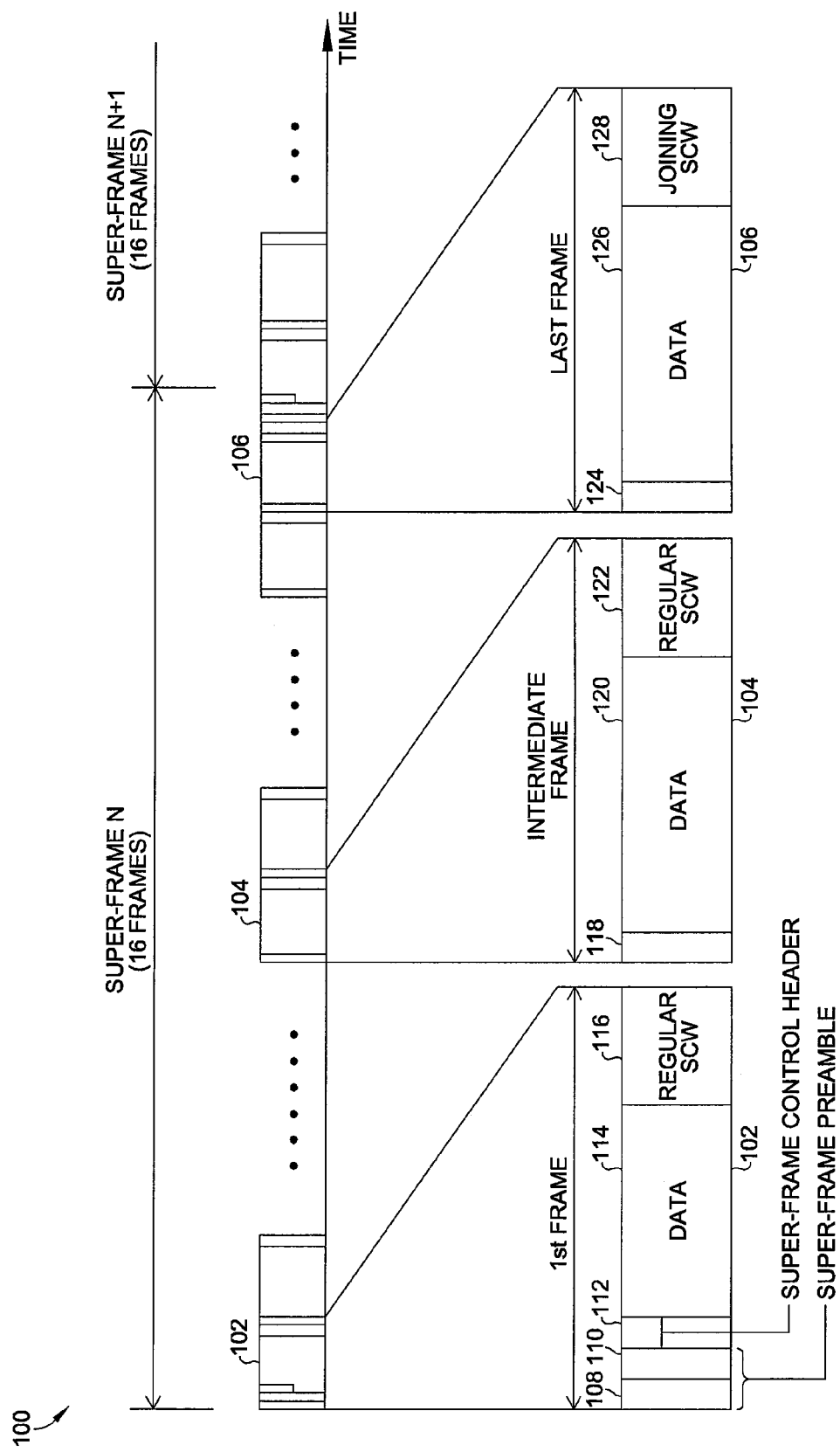
FIG. 1 is a diagram of a super-frame structure according to the present invention showing sixteen frames, wherein a first frame includes a super-frame preamble, a super-frame control header, a data portion, and a regular self-coexistence window, an intermediate frame includes an OFDM symbol, a data portion, and a regular self-coexistence window, and a last frame includes an OFDM symbol, a data portion, and a joining self-coexistence window.

Referring now to FIG. 1, a super-frame structure 100 is shown in the time domain according to an embodiment of the present invention. The purpose of the super-frame structure is to allow dynamic spectrum sharing between wireless systems that are operating in the same proximity and have overlapping coverage areas. The super-frame structure allows negotiation and coordination between wireless systems regarding the specifics of spectrum sharing, and the announcement of those negotiations so that other unlicensed systems in the coverage area can be notified.

The super-frame structure 100 of the present invention includes, for example, sixteen frames including a first frame 102, an intermediate frame 104, and a last frame 106. Although sixteen frames are shown in FIG. 1, the principle of the present invention is not obviated by using a different number of frames. The first frame includes a super-frame preamble including two OFDM symbols 108 and 110. The use of two OFDM symbols 108 and 110 is for robust identification to other wireless systems. Immediately after the super-frame preamble, there is a super-frame control header 112. The super-frame control header 112 is described in further detail below. The super-frame control header 112 may or may not need all of the available bandwidth during its allotted time slot. Immediately after the super-frame control header 112, there is the data payload 114, which is the information that is being transmitted among wireless systems in the coverage area of a wireless network. Finally, after the data payload 114, there is a "regular" self-coexistence window 116, which is also described in further detail below. The regular self-coexistence window 116 can be reserved by a particular wireless network. A representative intermediate frame 104 includes a preamble that occupies an OFDM symbol 118. Following the symbol 118 is the data payload 120. Finally, a regular self-coexistence window 122 is shown, which can also be reserved by a wireless system wishing to share spectrum with other wireless systems. The remaining intermediate frames are not shown in FIG. 1, but their structure would be the same as the intermediate frame 104 that is shown in FIG. 1. A last frame 106 includes a preamble, a data payload 126, and a "joining" self-coexistence window 128. The joining self-coexistence window 128 is different from the other self-coexistence windows in that it cannot be reserved. Any wireless system may occupy this self-coexistence window using a contention-based method, as is explained below.

Joining self-coexistence window 128 is used so that newcomer wireless systems may join in the spectrum sharing with the other existing wireless networks. The super-frame control header 112 is now described in further detail. Firstly, super-frame control header 112 includes format information. For example, the system type such as IEEE 802.22 wireless networks or other systems types is included. Other common information can be included such as any desired symbol. The super-frames are time-coordinated between the overlapping wireless systems and the super-frame control headers of the same type of systems will carry the same data and so there will be no collision between this data and no data will be lost. Super-frame control header 112 also includes a header check sequence to check for lost data. Super-frame control header 112 contains common (the same) system information across all wireless network systems on the same channel. Simultaneous transmissions of super-frame control headers containing different header contents will result in collisions. However, the use of the common control header information according to the present invention prevents such collisions. The control header information is transmitted simultaneously by all wireless networks on the same channel, which enables efficient wireless detection and discovery by other wireless systems.

A co-existence beaconing protocol data unit is now described for use in the reserved self-coexistence windows. The purpose of the protocol data unit is for better coordination between the competing wireless systems so that the details of spectrum sharing can be negotiated, such as spectrum contention tokens and the exact pattern of spectrum sharing in time.

Figure 2:
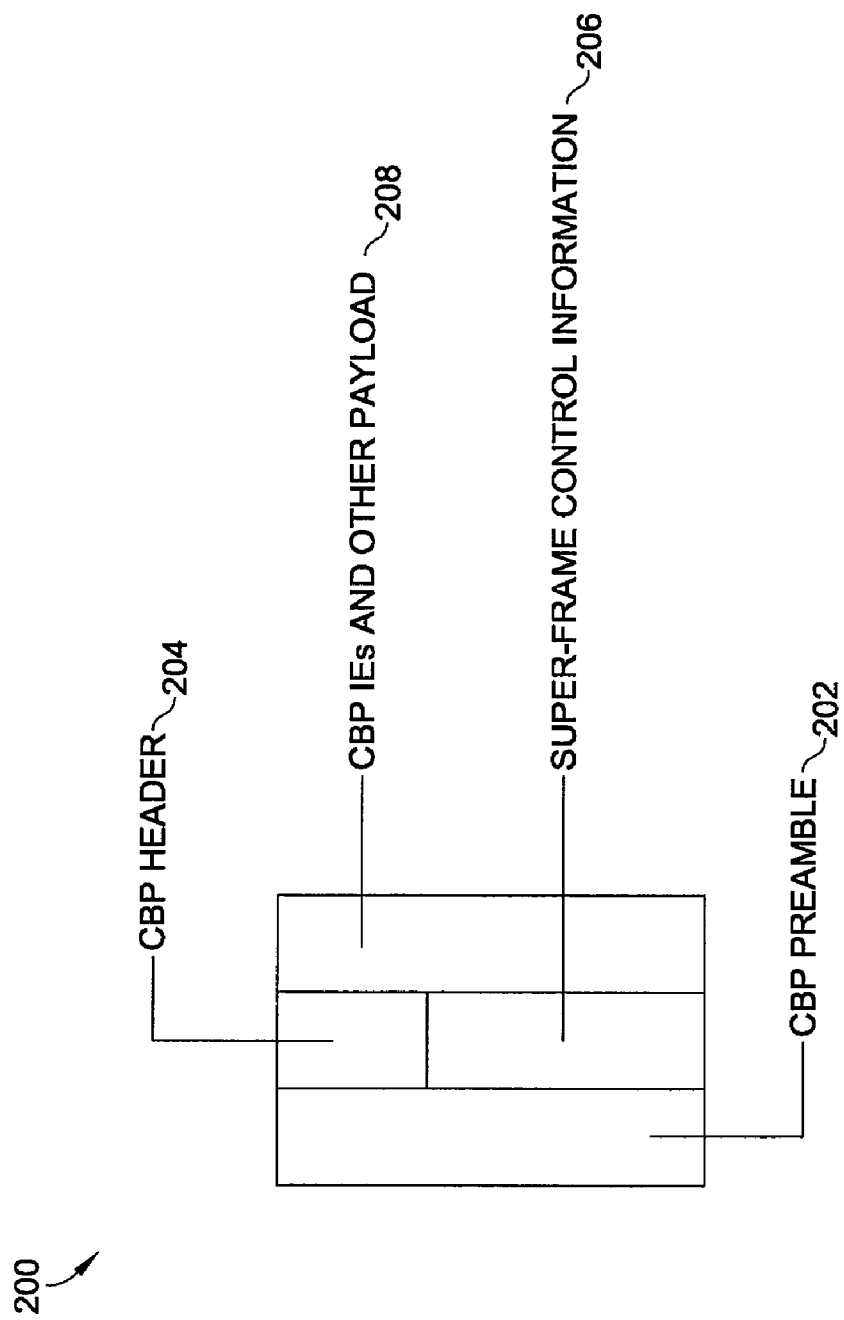
FIG. 2 is a diagram of three-symbol coexistence beaconing protocol data unit according to the present invention, including a preamble, header, super-frame control information, and information element.

Referring now to FIG. 2, a three-symbol Coexistence Beaconing Protocol, Protocol Data Unit ("CBP PDU") 200 is shown. CBP PDU 200 includes a CBP preamble 202, which contains a symbol. Immediately following the CBP preamble is a CBP header 204, which contains control information with regard to the usage of the CBP payload. Also following the CBP preamble is the super-frame control information (SCI) 206, that is described in further detail below. Finally, the CBP PDU 200 includes a CBP information element (IE) and other payload information, which is a collection of information components, such as spectrum sharing information or spectrum usage information. The SCI format in the CBP PDU includes the system type, such as IEEE 802.22 wireless networks, or other system type if used. A wireless network ID is the system identification. The SCI format 206 also includes a data frame reservation map in the current super-frame, to establish a pattern of what system will be transmitting data during predetermined data frames within the super-frame. The data frame reservation map includes data frame allocation for data services, but also includes data frame allocation for quiet periods so that the operation of the licensed systems within the coverage area can be sensed and detected. Finally, the SCI format 206 also includes a self-coexistence window (SCW) reservation map, which establishes the pattern for reserving these windows amongst the competing wireless systems.

Figure 3:
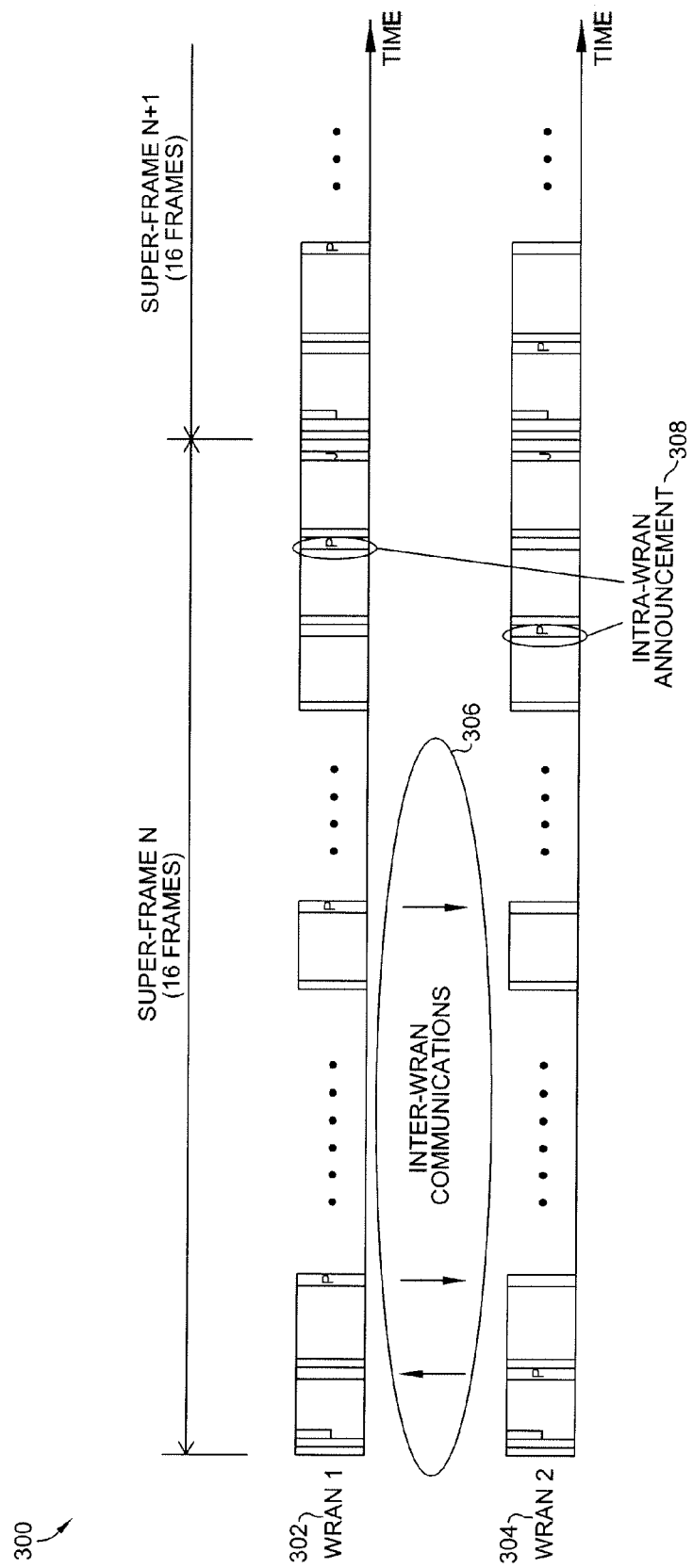
FIG. 3 is a diagram of two super-frames being employed by two different wireless networks, showing the inter-wireless communications for negotiating spectrum sharing, and an intra-wireless announcement announcing the results of the negotiations.

Referring now to FIG. 3, a wireless environment 300 including a first wireless network 302 and a second wireless network 304 is shown. FIG. 3 is a time-based representation of the negotiation between wireless networks (inter-wireless network communication 306) and the announcement of the results of the negotiations to other wireless systems as to the results of those negotiations (intra-wireless network announcement 308). Wireless networks 302 and 304 use SCWs (reserved or random-access based) to exchange coexistence messages. Negotiation for frame allocation and SCW allocation for the next (future) superframes are carried out during inter-wireless network communication 306. Note that in FIG. 3, communications during the reserved self-coexistence windows is shown that is taking place during several frames of the super-frame. Each wireless network base station uses its last reserved SCW to announce the latest negotiation decisions of bandwidth (frame and SCW) allocations to customer premises equipment (CPEs) within the wireless network cell. Note in FIG. 3 that the last reserved SCW during intra-wireless network announcement 308 is used for this purpose.

The "J" SCW, which is the last SCW in every super-frame, is accessed through CSMA (carrier sensing multiple access) by all wireless networks on a particular RF channel. CSMA is a contention-based method. Used complementarily with the reserved SCWs, the purposes of the "J" SCW is to allow, for example, a newly operating wireless network to communicate with the existing wireless networks or with the other newly starting wireless networks for spectrum resource reservation or contention (i.e. data frames or SCWs reservations), group joining, or other inter-wireless network communications purposes. A wireless network that doesn't have any SCW reservation to communicate with the other wireless networks can also use the "J" SCW.

Finally, coexistence communications (cross-channel) is explained according to the present invention.

Step 1: The wireless system on Channel "A" discovers the SCW reservation pattern on an in-band or out-of-band RF channel (Channel "X"). This can be done using the SCI information previously described or through constant monitoring of the channel.

Step 2: The wireless system on Channel "A" identifies the reserved SCWs (i.e. the Transmit Opportunities, "TXOPs") of the source wireless networks (the ones to which the receiving wireless network intends to listen) on Channel "X" from the discovered SCW pattern.

Step 3: The wireless system on Channel "A" receives the CBP PDU packets during the reserved SCWs of the source wireless networks on Channel "X", or during the J-SCW of Channel "X" in which the source wireless network could also transmit CBP packets.

The above three steps illustrate a one-way communication wherein the system on channel "A" desires to communicate with the wireless system on channel "X". For two-way communication, the process is reversed, but the same. The wireless system on channel "A" becomes the wireless system on channel "X", and vice versa.

According to the present invention, portions of the super-frame are transmitted by a base station and portions of the super-frame are transmitted by CPEs.

Although an embodiment of the present invention has been described for purposes of illustration, it should be understood that various changes, modification and substitutions may be incorporated in the embodiment without departing from the spirit of the invention that is defined in the claims, which follow.

I claim:

1. A coexistence communications method for use between wireless networks comprising:
   using a synchronized super-frame transmission structure in the wireless network, the super-frames within the transmission structure comprise a plurality of synchronized frames,
   wherein a first frame includes a super-frame preamble, a super-frame control header, a data portion, and a regular self coexistence window (SCW);
   wherein a plurality of intermediate frames includes a preamble, a data portion, and a regular self-coexistence window; and
   wherein a last frame includes a second preamble, a second data portion, and a joining self-coexistence window that is accessed by the wireless networks by carrier sense multiple access;
   using the regular self-coexistence windows to exchange co-existence messages between the wireless networks, and reserve data portions of frames and the regular self-coexistence windows by a negotiation process; and
   using a last reserved regular self-coexistence window to announce intra-wireless network negotiation decisions.

2. The method of claim 1 further comprising using orthogonal frequency division multiplexing for transmitting and receiving within each channel of the networks.

3. The method of claim 1 further comprising using coexistence beacon protocol signaling within the regular SCWs.

4. The method of claim 1 further comprising using an out-of-band RF channel to transmit a self-coexistence reservation pattern.

5. A method for intercell communication for use in a cognitive radio network (CRN), comprising:
   transmitting and receiving using synchronized super-frames, the super-frames comprising a plurality of synchronized frames;
   wherein a first frame in a super-frame includes a super-frame preamble, a super-frame control header, a data portion, and a regular self-coexistence window (SCW);
   wherein an intermediate frame in the super-frame comprises a preamble, a data payload and a regular SCW;
   wherein a last frame in the super-frame comprises a second preamble, a second data payload and a Joining SCW;
   wherein the regular SCWs are used by the cells of the CRN to reserve data portions of frames by a negotiation process; and
   wherein the joining SCW is accessed through carrier sensing, multiple access by all cells of the CRN on a particular radio frequency channel.

6. The method of claim 5 wherein the super-frame control header comprises information common to other cells in the CRN.

7. The method of claim 5 wherein the super-frame control header comprises a header check sequence.

8. The method of claim 5 wherein the regular self-coexistence window comprises a coexistence beaconing protocol signal.

9. The method of claim 8 wherein the coexistence beaconing protocol signal comprises a three-symbol protocol data unit.

10. The method of claim 9 wherein a first symbol of a protocol data unit comprises a coexistence beaconing protocol signal preamble.

11. The method of claim 9 wherein a second symbol of a protocol data unit comprises a coexistence beaconing protocol signal header and super-frame control information.

12. The method of claim 9 wherein a third symbol of a protocol data unit comprises a coexistence beaconing protocol signal information element.

13. The method of claim 11 wherein the super-frame control information comprises a system type.

14. The method of claim 11 wherein the super-frame control information comprises a CRN identification ID.

15. The method of claim 11 wherein the super-frame control information comprises a data frame reservation map.

16. The method of claim 11 wherein the super-frame control information comprises a self-coexistence window reservation map.

17. The method of claim 5 further comprising using orthogonal frequency division multiplexing for transmitting and receiving within each channel of the CRN.

18. The method of claim 5 further comprising using the 802.22 standard for transmission.

* * * * *